United States Patent [19]

Kalfoglou

[11] 4,230,183

[45] Oct. 28, 1980

[54] METHOD FOR TREATING SUBTERRANEAN, CLAY-CONTAINING EARTH FORMATIONS

[75] Inventor: George Kalfoglou, Houston, Tex.

[73] Assignee: Texaco Inc., White Plains, N.Y.

[21] Appl. No.: 968,314

[22] Filed: Dec. 11, 1978

[51] Int. Cl.$^2$ ............................................. E21B 43/22
[52] U.S. Cl. ................................ 166/274; 166/305 R; 252/855 D
[58] Field of Search ........... 166/273, 274, 275, 305 R; 252/855 D

[56] References Cited

U.S. PATENT DOCUMENTS

| | | | |
|---|---|---|---|
| 2,238,930 | 4/1941 | Chamberlain et al. | 166/305 R |
| 2,771,138 | 11/1956 | Beeson | 166/274 |
| 2,947,360 | 8/1960 | Bernard | 166/274 |
| 3,701,384 | 10/1972 | Routson et al. | 166/273 X |
| 3,762,485 | 10/1973 | Chesser et al. | 166/305 R |
| 3,827,977 | 8/1974 | Miles et al. | 166/305 R |
| 3,843,524 | 10/1974 | Perricone et al. | 166/305 R X |
| 3,926,258 | 12/1975 | Hessert et al. | 166/275 X |
| 4,129,183 | 12/1978 | Kalfoglou | 166/305 R |

*Primary Examiner*—Stephen J. Novosad
*Assistant Examiner*—George A. Suchfield

*Attorney, Agent, or Firm*—C. G. Ries; Robert A. Kulason; Jack H. Park

[57] ABSTRACT

Disclosed is a method for treating subterranean earth formations containing appreciable amounts of water-sensitive clays, including petroleum-containing formations, in order to render the clay content of the formation less sensitive to swelling and other phenomena which cause reductions in permeability of the earth formation when the clay content is contacted with relatively fresh water. The method involves contacting the clay with an aqueous solution of a chelated polyvalent metal ion, specifically chelated transition metal ions, including magnesium, vanadium, chromium, manganese, iron, cobalt, nickel, copper, zinc, ruthenium, rhodium, silver, cadmium, iridium, platinum, gold, mercury and lead. The chelating organic ligands are ethylene diamine, diaminopropane, diaminobutane, diethylenetriamine, triethylenetetraamine, tetraethylenepentamine, pentaethylenehexamine, tris(aminoethyl)amine, triaminopropane, diaminoaminoethylpropane, diaminomethylpropane, diaminodimethylbutane, bipyridine, dipyridylamine, phenanthroline, aminoethylpyridine, terpyridine, biguanide and pyridinealdazine.

14 Claims, No Drawings

METHOD FOR TREATING SUBTERRANEAN, CLAY-CONTAINING EARTH FORMATIONS

FIELD OF THE INVENTION

This invention concerns a method for treating subterranean formations. More particularly, this invention concerns a method for treating subterranean formations containing appreciable amounts of clay minerals which swell, disperse and/or migrate on being contacted with fresh water and reduce the permeability of the formation which interferes with enhanced oil recovery methods involving injecting relatively fresh water or steam into the formation. The treatment desensitizes the clay minerals to subsequent contact to fresh water, and may be applied to formations which have already suffered permeability loss due to contact with fresh water, in order to reverse the clay swelling related permeability loss.

BACKGROUND OF THE INVENTION

It is well recognized in the literature relating to oil recovery methods that only a small percentage of the oil present in subterranean reservoirs or earth formations can be recovered by primary recovery methods, and some supplemental recovery method must be applied to the reservoirs to extract appreciable amounts of additional petroleum. Commonly used supplemental recovery methods include waterflooding and steam injection, and methods which show considerable promise for future use include micellar flooding and flooding with a surfactant fluid or solution. Many of these supplemental recovery methods employ relatively fresh, i.e. low salinity and low hardness water. When fresh water contacts formations containing appreciable amounts of certain types of clay minerals, particularly the bentonites or sodium montmorillonites, swelling of the clay minerals occurs and in many instances the net result of injecting fresh water into the formation is substantial loss of permeability such that further fluid injection is made more difficult or even rendered completely impossible.

The above described basic problem is well recognized by persons skilled in the art of oil recovery, and many treatments have been described in the literature applied to formations for the purpose of reducing the sensitivity of clay-containing formations to contact with fresh water with only limited success. The use of relatively high salinity brines may be undertaken for waterflooding purposes if such are available, although this is not completely satisfactory for several reasons. The presence of high levels of sodium and other monovalent cations in the injected brines may not induce immediate clay swelling to levels that is caused by fresh water, but the high sodium content actually increase the propensity for the water sensitive clays to swell on later contact with fresh water. Moreover, if surfactant waterflooding is to be applied, most commonly available and inexpensive surfactants are not tolerant of the high salinity brines, and so fresh water must ultimately be injected into the formation for the pupose of decreasing the formation water salinity so as to permit use of commonly employed surfactants such as petroleum sulfonate. Moreover, steam flooding is a very successful method of supplemental recovery, especially for viscous crudes, and steam injection into the formation necessarily causes contact between earth formation minerals and very fresh water, i.e. the steam condensate.

In view of the foregoing brief discussion, it can be appreciated that there is an essential need for a method for treating subterranean, clay-containing earth formations so as to permanently and irreversibly render the formation insensitive to subsequent contact with fresh water.

DESCRIPTION OF THE PRIOR ART

U.S. Pat. No. 3,444,931 describes a method for treating clay-containing formations with a water soluble guanidine salt. This requires the use of a polarized organic solvent, specifically a lower alkanol, and is therefore quite expensive.

U.S. Pat. No. 3,382,924 describes the use of hydrolyzable polyvalent ions for treating water sensitive clay-containing formations but requires the use of an acidic medium for maximum effectiveness. This material is incompatible with higher pH fluids which are injected later during supplemental recovery techniques, as well as with high pH fluids such as drilling mud filtrates which may remain present in the formation after drilling of the well, and which cause precipitation of the polyvalent ions injected in the form of inorganic salts.

U.S. Pat. No. 3,621,913 describes a method for treating fresh water sensitive clay-containing formations with an aqueous solution of an inorganic aluminum salt such as aluminum chloride. While this is inexpensive and effective, the treatment is not as persistent as is desired and is sensitive to subsequent contact with high pH fluids.

In view of the foregoing discussion, it can be appreciated that there is a serious, unfulfilled need for a method for treating a subterranean, earth formation, particularly a petroleum containing earth formation, which formation minerals include a sufficient amount of water sensitive clay minerals that the formation is sensitive to contact with fresh water, and experiences substantial loss of permeability on contact with fresh water, by employing a method which is relatively inexpensive, persistent, and which is insensitive to contact with high pH fluids employed in subsequently applied processes.

SUMMARY OF THE INVENTION

I have discovered, and this constitutes my invention, that permeable earth formations including petroleum-containing formations, which contain water sensitive clay minerals including sodium montmorillonites, illites, and other clay minerals which swell or expand on being contacted with fresh water, can be treated so as to render the water-swellable clay fractions of the formation insensitive to subsequent contact with fresh water, or to reverse the permeability-decreasing swelling phenomena which has already occurred as a consequence of prior contact with low salinity water, by a method which is relatively inexpensive, and which treatment is very persistent with time and subsequent passage of fluids through the formation, and which is not affected by contact with high pH fluids in subsequently applied processes. The method comprises injecting into the formation an aqueous solution of a chelated, polyvalent transition metal ion. The specific metal ions used include magnesium, vanadium, chromium, manganese, iron, cobalt, nickel, copper, zinc, ruthenium, rubium, silver, cadmium, irridium, platinum, silver, mercury and lead. The organic ligand which is the chelating agent are those which form five or six membered ring structures with the metal cations, and which preserve the positive charge on the cation. Amines wich can be used as the chelating ligands are ethylenediamine, 1,2-diaminopropane; 1,3-diaminopropane; 2,3-diaminobutane; diethylenetriamine; triethylenetetramine; tetraethylenepentamine; pentaethylenehexamine; tris(aminoethyl)amine; 1,2,3-triaminopropane; 1,2-diamino-2-aminoethylpropane; 1,2-diamino-2-methylpropane; 2,3-diamino-2,3-dimethylbutane; 2,2'-bipyridine; 2,2'-dipyridylamine; 1,10-phenanthrolamine; 2-aminoethylpyridine; terpyridine; biguanide and pyridine-2-aldazine. The aqueous treating fluid contains from 0.01 to 10 and preferably 0.1 to 5.0 percent by weight of the chelated polyvalent metal ion. The treatment may be applied prior to contact with fresh water in order to prevent loss of permeability in the flow channels of the earth formation resulting from subsequent contact with fresh water, or it may be applied to a formation which has already experienced permeability loss due to contact between fresh water and the water sensitive clay minerals. The treatment fluid may be injected into the formation for near wellbore treatment of the portion of the formation immediately adjacent to an injection well or a production well or both, and displaced away from the formation by subsequently injected oil displacement fluids in an enhanced recovery process. When used for near wellbore treatment, the quantity of treating fluids should be from 50 to 1000 and preferably 100 to 700 gallons of fluid per foot of formation thickness. When injected into the formation for in-depth treatment of water sensitive clays in combination with an enhanced recovery process, the quantity of fluid required is from 0.01 to 1 and preferably from 0.05 to 0.5 pore volumes of treating fluid.

DESCRIPTION OF THE PREFERRED EMBODIMENTS

Briefly, the process of my invention comprises injecting an aqueous fluid containing a chelated polyvalent metal ion into a subterranean earth formation which formation contains an amount of water sensitive clays such as sodium montmorillonite, illites, etc. that they are sensitive to contact with fresh water, and a permeability loss results from swelling of the clay minerals when fresh water is injected into the formation. The aqueous treating fluid renders the water sensitive clay minerals insensitive to subsequent contact with fresh water, thus permitting injection of fresh water into the pretreated formation over long periods of time.

It is well recognized by persons skilled in the art of oil recovery that rock properties are of prime importance in supplemental oil recovery techniques involving injection of water. Maintaining injectivity becomes a problem in cases where producing formations are water sensitive. Damage to permeability is caused by small amounts of montmorillonite and other types of clay present in the formation. When clay particles in the portion of the formation adjacent to pore spaces or flow channels of the formation are exposed to fresh water, the clays swell and disperse, moving downstream and forming blockages in the flow channels of the formation.

The water sensitivity of formations is increased in most instances by exposing the water sensitive clay mineral particles to monovalent cations, especially those cations that are easily hydratable, and sensitivity is decreased by exposing the clay minerals to polyvalent ions.

The permeability of clayey formations depends on the extent of coagulation of the individual clay particles in the pore spaces of the rocks. Permeability is high and remains high if the clay particles are all coagulated into compact aggregates too large to migrate under the influence of moving fluids passing through the flow channels. Permeability is low if the clay particles swell and disperse, thus preventing the flow of moving fluids by forming blockages in the pore throats of the formation. Thus the larger the size of the dispersed clay particles, the more likely they are to migrate and form blockages in the flow channels of the formation.

Clay mineral particles have internal chemical defects that produce localized negative charges on the surface of the platelets. These negative charges are electrostatically balanced by cations surrounding the clay particles forming ionic clouds around them. These cations are called exchangeable cations of the clay particles because they can be exchanged with other ions under proper conditions, such as by causing contact between the clay particles and aqueous solutions of other ions. The electric charges on clay particles generate electrostatically repulsive forces, whereas the masses of clay particles give rise to Van der Waal's attractive forces. The net result of these attractive and repulsive forces determines whether the clay particles will be in a coagulated or dispersed state, when they are suspended and dispersed in a fluid such as water. The thickness of the cationic cloud controls the strength of the repulsive forces. The smaller the cationic cloud around each particle, or the more contracted the electric double layer, the more effective the neutralization of the localized negative charges of the surface of the clay platelets will be. Effective neutralization of the negative charge on clay platelets by cations tends to cause coagulation or shrinking of clay particles. Expansion of the electric double layers of clay platelets leads to swelling and dispersion of clay particles.

The attraction of cations toward the clay particles depends on the total charge density of the particle and the total effective charge and concentration of the cations. The diffusion of exchangeable cations toward the bulk solution depends on the concentration of ions in the bulk solution. Therefore the exchangeable cation cloud will be diffused in distilled water, causing clay particles to be dispersed whereas the exchangeable cation clouds will be compressed in high concentrations of electrolyte where clay particles will be coagulated.

Positively charged ions when introduced into clay suspensions or dispersions, decrease the thickness of the double layer or ions on the clay particles, thus suppressing clay swelling and in the instance of clay-containing earth formations, reduces the instance of dispersion of clay particles within the flow channels of the formation and consequently will reduce the loss of formation permeability. It is reported in the literature that the concentration of electrolytes required to decrease the potential energy of interaction between the electrical double layers of two particles is proportional to the inverse power of the counter ion valence, (Vold, M. J. and Vold, R. D. "Colloid Chemistry", Reinhold, New York, 1964).

The sensitivity of water sensitive clay-containing formations to contact with fresh water is increased by exposure to monovalent ions such as sodium and hydrogen ions. The primary reason for the dispersion of clays, which is the mechanism leading to formation permeability loss, is expansion of clay particles due to hydration of the sodium cations which are adsorbed between platelet faces. If the fluid flow through the formation is to be changed from sodium chloride solution to fresh water, the concentration of sodium ions in the bulk solution drops. The readily hydratable sodium ions adsorbed on the clay particles attracts a large number of molecular layers of water, causing expansion between clay platelets and thus weakening the Van der Waal's forces tending to hold the particles together. Thereafter the clay particles readily swell and disperse with shear force generated by the flowing fluid in the formation flow channels. Abrupt changes from high salinity to fresh water cause very abrupt swelling of clay and sudden loss in formation permeability.

Potassium is less prone to cause clay swelling and the loss of formation permeability caused by clay swelling than sodium. It is also known in the literature that treating water sensitive clay-containing formations with aqueous solutions of polyvalent metals ions such as aluminium chloride or zirconium oxychloride stabilizes the claycontaining formations to subsequent contact with fresh water, although such simple inorganic salts of polyvalent metals cations are not chemically stable over wide pH ranges. Thus the polyvalent metal ions lose their ability to control clay swelling as the pH increases because of the precipitation of the polyvalent metal ion. Moreover, while it is true that the larger the metal ion charge the more effective it is for preventing clay swelling, it is also true that the larger the metal ion charge the lower the pH at which precipitation occurs.

I have discovered that the desirable chemical stabilizing property of polyvalent ions may be achieved in treating earth formations without also encountering the high sensitivity to high pH fluids such as occurs when using inorganic metal salts, by employing an aqueous solution containing a chelated polyvalent metal ion. Specifically, the complexes to be employed in the treating fluid of my invention are chelates of transition metal ions which have high affinity toward nitrogen ions, since the organic chelated ligands must be nonionic in order to preserve the positive charge on the resulting complex cation. The preferred organic ligands are those which contain two nitrogen atoms and form five-membered rings with the central atom, since they yield the most stable chelate complex. These complexes are thermally stable, and since all of the coordination sites of the central metal ion are occupied by organic ligands, the chelated complex does not hydrolyze to form a precipitate when exposed to high pH fluids. The chelated polyvalent mineral ions are effective as clay stabilizing agents over a very wide pH range, such as from pH of 0.1 to 12.0, without decreasing the clay stabilizationeffectiveness of the treating solution.

The presence of the organic ligands in the treating fluid appears to achieve another advantage, since the chemical nature of the ligands enhances the clay stabilization tendency, in addition to the stabilization achieved by the polyvalent metal ions. The higher the positive charge of the metal ions, the more hydrophobic the ligands, the better the effectiveness of these complexes is for coagulating clays, and hence the more effective the complex will be for reversing or preventing fresh water induced clay swelling and its deleterious affect on earth formations.

The process of my invention involves injecting into a formation, an aqueous solution containing a chelated polyvalent transition metal ion. The metals which are suitable for use in the process of my invention include magnesium, vanadium, chromium, manganese, iron, cobalt, nickel, copper, zinc, ruthenium, rhodium, silver, cadmium, iridium, platinum, gold, mercury and lead. The especially preferred metal ions for use in this invention, because of low cost and freedom from any objectionable side effects include cobalt, nickel, chromium, iron and copper. The organic liquids which are effective chelating agents for these polyvalent metal ions are those which form five or six-membered ring structures with the cations. Amines are especially preferred since they preserve the positive charge of the cation. The preferred amines include ethylenediamine, 1,2-diaminopropane, 1,3-diaminopropane, 2,3-diaminobutane, diethylenetriamine, triethylenetetramine, tetraethylenepentamine, pentaethylenehexamine, tris(aminoethyl)amine, 1,2,3-triaminopropane, 1,2-diamino-2-aminoethylpropane, 1,2-diamino-2-methylpropane, 2,3-diamino-2,3-dimethylbutane, 2,2'-bipyridine, 2,2'-dipyridylamine, 1,10-phenanthroline, 2-aminoethylpyridine, terpyridine, biguanide, and pyridine-2-aldazine.

The above described chelated polyvalent metal complex is employed in the form of an aqueous treating fluid, generally a solution. The concentration of the chelated polyvalent metal complex in the treating solution is in the range from 0.01 to 10 and preferably from 0.1 to 5 percent by weight. If the treating fluid is to be applied for the purpose of achieving clay stabilization of a portion of the formation immediately adjacent to the wellbore, i.e. if it is felt that stabilization is only necessary in the critical portion of the formation which is from 5 to 10 feet around a wellbore, then it is adequate to inject a quantity of treating fluid which is from 50 to 1000 and preferably from 100 to 700 gallons of fluid per foot of formation thickness. The volume required is a function of both the depth of treatment required and the porosity of the formation. If the treatment is desired in greater depth in the formation such as in the recovery zone between the injection well and the production well, then it is necessary to inject considerably larger quantities of fluid into the formation and displace it away from the point of injection by injecting a second fluid such as water. The volume of treating fluid required for this embodiment is from 0.01 to 1.0 and preferably from 0.05 to 5.0 pore volumes based on the pore volume of the recovery zone. This embodiment may be employed in combination with an enhanced oil recovery method such as waterflooding, steam flooding, surfactant flooding, etc. in which case it is preferred that the aqueous treating fluid continuing the chelated polyvalent metal ion be injected first, and then displaced away from the injection well by water or by the above described oil-displacing fluid being employed in enhanced recovery technique. This insures that the water-sensitive clay portions of the formation will be contacted by the desensitizing treating fluid prior to be contacted with fresh water present in the oil recovery fluid. While the preferred method of employing this process involves contacting the formation material with the treating fluid prior to allowing contact between fresh water and the fluid, the treating fluid may also be used to reverse the loss of permeability experienced when fresh water contacts clay minerals, and so may be applied to a formation after loss of permeability has already occurred.

The above described treatment procedure, particularly that directed to one near wellbore formation treating, may be applied to either an injection well or a production well.

EXPERIMENTAL

The following describes laboratory experiments involving synthesis of several chelated polyvalent metal complexes within the scope of my invention, and evaluation of the effectiveness of this material for rendering water swellable clays insensitive to fresh water.

EXAMPLE I

A quantity of tris(ethylenediamine)cobalt chloride was prepared by reacting cobaltous chloride hexahydrate ($CoCl_2.6H_2O$) with ethylenediamine and hydrochloric acid. More specifically, 96 grams of cobaltous chloride hexahydrate was dissolved in 300 ml of water. A 30 percent ethylenediamine solution was prepared by diluting 80.8 grams of ethylenediamine in 163.2 grams of water, and partially neutralizing this solution with 66 ml. of 6.12 normal hydrochloric acid. The partially neutralized ethylenediamine was slowly added to the cobaltous chloride hexahydrate solution while stirring. Air was then bubbled through this mixture and the contents stirred for 5 hours until the product changed from dark red to a reddish brown, after which the solution was heated to decrease the volume to about 400 ml. This was then diluted with 1000 ml of distilled water and it was calculated that the resultant product concentration was 13.8 percent by weight or about 0.4 Molar.

EXAMPLE II

A sample of tri(ethylenediamine)nickel (II) chloride was prepared by reacting nickelous chloride hexahydrate with ethylenediamine. More specifically, 23.8 grams of nickelous chloride hexahydrate was dissolved in 150 ml of water. A 70 percent by weight ethylenediamine solution was prepared by diluting 21.6 grams of ethylenediamine and 6.4 grams of water. The 70 percent ethylenediamine solution was slowly added directly to the mixture of nickelous chloride hexahydrate solution while stirring. A purple solution was formed and this was evaporated to about 60–80 ml and two drops of ethylenediamine were then added. After cooling to room temperature, the orchid-colored crystals were filtered by suction. The crystals were washed with 95 percent ethyl alcohol and were vacuum dried.

EXAMPLE III

A quantity of tris(propylenediamine)cobalt (III) chloride was prepared by reacting cobaltous chloride hexahydrate with propylenediamine and hydrochloric acid. Specifically, 47.59 grams of cobaltous chloride hexahydrate was dissolved in 150 ml of water. A propylenediamine solution was prepared by dissolved 58.6 grams of 90 percent propylenediamine in 120 grams of water and the resulting solution was partially neutralized by adding 34.7 ml of 6.12 normal hydrochloric acid. The partially neutralized propylenediamine were slowly added to the cobaltous chloride hexahydrate solution while stirring. Air was bubbled through the solution for 4 hours and the resultant solution was then evaporated to a volume of about 100 ml. A reddish brown crust was formed on the surface of the solution. The solution was then treated with 35 ml of concentrated hydrochloric acid, at which point the product changed to green. Ethyl alcohol was added to precipitate the salt. The product was then filtered and washed with ethyl alcohol and vacuum dried to produce light yellow colored crystals.

EXAMPLE IV

A quantity of tris($\alpha,\alpha'$-dipyridyl)nickel (II) chloride was made by reacting nickelous chloride hexahydrate and $\alpha,\alpha'$-dipyridyl as desribed below. Specifically, 4.58 grams of nickelous chloride hexahydrate and 8.97 grams of $\alpha,\alpha'$-dipyridyl were mixed in 25 ml water and warmed until a deep red solution resulted. This solution was evaporated to about 20 ml and cooled, at which point violet-pink crystals were observed. The product was filtered and dried and violet-pink crystals of the desired nickel chelate were recovered.

EXAMPLE V

A quantity of tris(o-phenanthroline)cobalt (III) chloride was prepared by reacting cobaltous chloride hexahydrate and o-phenanthroline monohydrate. Specifically, 2.4 grams of cobaltous chloride hexahydrate and 6.0 grams of o-phenanthroline monohydrate were mixed in 100 ml of water and heated until the reactants were dissolved, forming a yellowish brown solution. Ten ml of concentrated hydrochloric acid was then added to the solution which changed the solution color to orange. The product was evaporated to 50 ml, forming a 0.10 Molar solution of the above described product.

CLAY COAGULATION TESTS

The effectiveness of the previously described chelated polyvalent metal ions for coagulating clay was determined in a series of laboratory tests using the synthesized chelates and bentonite, a sodium montmorillonite. In these tests, 0.2 grams of dry bentonite was added to 15 ml centrifuge tubes, and to this was added 10 ml of each coagulating agent being tested. The bentonite was thoroughly mixed with the coagulating agent and allowed to remain for at least 24 hours prior to the centrifuging tests. Each sample was centrifuged at 2800 rpm for 15 minutes, and the volume of centrifuged solids was measured and tabulated. The coagulating treating solutions were then removed from the centrifuge tubes, and distilled water was added to these centrifuge tubes in 10 ml portions. After each addition, the clay was mixed thoroughly with the distilled water and allowed to remain in contact therewith for at least 1 day, after which the volume of clay solids in the bottom of the centrifuge tube was again determined.

Results of the first series of tests are given in Table I below. It can be seen that parallel tests using aluminum nitrate and cobaltous chloride were also conducted to demonstrate the relative effectiveness of these inorganic salts as compared to the chelated cobalt ions. For each line of data, the Molar concentration of the treating reagent is given in the first column. In the second and third column are given the clay solids volume after treating with aluminum nitrate, and then after being contacted with distilled water and recentrifuged. In the fourth and fifth column are given the clay solids volumes after treatment with cobaltous chloride, and then after contact with water. It can be seen that while the inorganic cobalt salt is quite effective in reducing the volume of solids, its effectiveness is not persistent since at all treatment levels the volume increased significantly after the centrifuged solids were recontacted with water. In the sixth and seventh columns are given the results of treating with tris(ethylenediamine)cobalt, the substance synthesized in Example I given above.

TABLE I
CLAY COAGULATION TESTS
BENTONITE TREATED WITH COAGULATING AGENTS;
COAGULATED BENTONITE EXPOSED TO DISTILLED WATER

| Concentration | FRACTION OF SOLIDS | | | | | |
|---|---|---|---|---|---|---|
| (Molarity) | $Al(NO_3)_3$ | $H_2O$ | $CoCl_2$ | $H_2O$ | $Co(en)_3Cl_3$ | |
| $5.0 \times 10^{-3}$ | 0.130 | 0.110 | 0.30 | 1.0 | 0.120 | 0.105 |
| $1.0 \times 10^{-2}$ | 0.080 | 0.071 | 0.15 | 1.0 | 0.083 | 0.068 |
| $2.0 \times 10^{-2}$ | 0.065 | 0.060 | 0.10 | 1.0 | 0.068 | 0.058 |
| $5.0 \times 10^{-2}$ | 0.045 | 0.049 | 0.06 | 1.0 | 0.048 | 0.041 |
| $1.0 \times 10^{-1}$ | 0.046 | 0.050 | 0.05 | 1.0 | 0.037 | 0.034 |
| $2.0 \times 10^{-1}$ | — | — | — | — | 0.034 | 0.033 |
| $4.0 \times 10^{-1}$ | — | — | — | — | 0.032 | 0.031 |

In the next series of clay coagulation tests, the effectiveness of tris(propylenediamine)cobalt (III) chloride, the reagent synthesized in Example III above, and of tris(o-phenanthroline)cobalt (III), the substance synthesized in Example V above, were determined. The tests were essentially as is described above. The data in Table II below demonstrates the superior result of both of these chelated polyvalent ion treating fluids at all of the concentration levels tested.

TABLE II
CLAY COAGULATION TESTS
BENTONITE TREATED WITH COAGULATING AGENT;
COAGULATED BENTONITE EXPOSED
TO DISTILLED WATER

| Concentration | FRACTION OF SOLIDS | | | |
|---|---|---|---|---|
| (Molarity) | $Co(pn)_3Cl_3$ | $H_2O$ | $Co(phen)_3Cl_3$ | $H_2O$ |
| $5.0 \times 10^{-3}$ | 0.190 | 0.145 | 0.122 | 0.100 |
| $8.0 \times 10^{-3}$ | 0.180 | 0.140 | 0.092 | 0.085 |
| $1.0 \times 10^{-2}$ | 0.160 | 0.132 | 0.083 | 0.074 |
| $2.0 \times 10^{-2}$ | 0.108 | 0.094 | 0.069 | 0.055 |
| $5.0 \times 10^{-2}$ | 0.069 | 0.060 | 0.050 | 0.049 |
| $1.0 \times 10^{-1}$ | 0.048 | 0.044 | 0.039 | 0.039 |
| $2.0 \times 10^{-1}$ | 0.047 | 0.045 | — | — |
| $4.0 \times 10^{-1}$ | 0.043 | 0.040 | — | — |

In the next series of coagulation tests, the effectiveness of tris(ethylenediamino)cobalt (II) chloride, the chelate formed in Example II above, and of tris($\alpha,\alpha'$-dipyridyl)nickel (II) chloride, the chelate formed in Example IV above, were determined. For comparison in this series, inorganic nickel chloride was tested at the same concentration levels employed in the test of the effectiveness of the chelated nickel treating reagents.

TABLE III
CLAY COAGULATION TESTS
BENTONITE TREATED WITH COAGULATING AGENTS:
COAGULATED BENTONITE EXPOSED TO DISTILLED WATER

| Concentration | FRACTION OF SOLIDS | | | | | |
|---|---|---|---|---|---|---|
| (Molarity) | $NiCl_2$ | $H_2O$ | $Ni(en)_3Cl_2$ | $H_2O$ | $Ni(dip)_3Cl_2$ | $H_2O$ |
| $5.0 \times 10^{-3}$ | 0.310 | 1.0 | 0.240 | 0.20 | 0.42 | 0.48 |
| $1.0 \times 10^{-2}$ | 0.150 | 1.0 | 0.140 | 0.11 | 0.29 | 0.33 |
| $2.0 \times 10^{-2}$ | 0.103 | 1.0 | 0.103 | 0.086 | 0.195 | 0.23 |
| $5.0 \times 10^{-2}$ | 0.065 | 1.0 | 0.070 | 0.062 | 0.095 | 0.11 |
| $1.0 \times 10^{-1}$ | 0.051 | 1.0 | 0.057 | 0.051 | 0.043 | 0.048 |
| $2.0 \times 10^{-1}$ | 0.045 | 1.0 | 0.038 | 0.038 | — | — |
| $5.0 \times 10^{-1}$ | 0.045 | 1.0 | 0.033 | 0.033 | — | — |

It can be seen from the foregoing example that both of the nickel chelates were highly effective and very persistent, whereas the treatment employing the inorganic nickel salt was less effective and not at all persistent.

Another series of clay coagulation tests were conducted to verify the wide pH range over which these chelated polyvalent metal ions are effective. In all of these tests, the bentonite was treated with $1.0 \times 10^{-2}$ molar solutions of the three listed cobalt chelates, and the pH was varied from 0.5 to 12.10. It has been seen from the data in Table IV below that all three of the chelates were highly effective over the entire range at which the tests were conducted, which verifies the exceptionally wide pH range at which these chelated polyvalent metal ion treating fluids may be used.

TABLE V
CLAY COAGULATION TESTS
BENTONITE TREATED WITH $1.0 \times 10^{-2}M$
COAGULATING AGENT AT VARIOUS pH VALUES

| pH | $Co(en)_3Cl_3$ | pH | $Co(pn)_3Cl_3$ | pH | $Co(phen)_3Cl_3$ |
|---|---|---|---|---|---|
| 0.55 | 0.050 | — | — | 0.35 | 0.062 |
| 1.17 | 0.059 | 1.10 | 0.060 | 1.05 | 0.083 |
| 2.00 | 0.072 | 2.00 | 0.092 | — | — |
| 3.00 | 0.104 | 3.00 | 0.138 | — | — |
| 5.58 | 0.102 | 5.05 | 0.160 | 4.12 | 0.135 |
| 7.05 | 0.100 | 6.80 | 0.150 | 6.90 | 0.136 |
| 9.20 | 0.102 | 8.60 | 0.150 | 9.70 | 0.138 |
| 11.05 | 0.115 | 11.38 | 0.170 | 11.50 | 0.050 |
| 12.10 | 0.064 | 12.03 | 0.070 | — | — |

CORE PERMEABILITY MEASUREMENTS

In order to verify that the above-described clay swelling tests accurately indicate the effectiveness of the chelated polyvalent ion treating fluids for controlling loss of permeability in earth formations due to clay swelling, a series of core floods were performed. The cores used were obtained from the Sespe Zone, South Mountain Field, Ventura County, Calif. This is known to be a formation which experiences loss of permeability on contact with fresh water. X-ray analysis of core material revealed that the cores contained from 15-18 percent montmorillonite. The cores were cut to standard sizes using kerosine as lubricant to avoid damaging the cores. The cores were then extracted to an oil-free state using a benzene methanol mixture, dried overnight in a vacuum oven at 100° C., and then cooled and stored in a dessicator. Liquid permeability measurements were made by mounting these cores in a Hassler holder and saturating the cores by the evacuation method. The pressure drop across the pores was maintained at 60 pounds per square inch in all of the tests. The flow rates were determined by measuring the collected effluent from the cores in specified time intervals, and from this data the permeability of the core samples was determined.

From the above-described clay coagulation test, it was determined that tris(ethylenediamine)cobalt (III) chloride was a very preferred stabilizing agent, and this was the chelated polyvalent ion complex tested in these permeability measurement experiments. In the course of these experiments, the core was first flooded with distilled water, and it was determined that the permeability of the core dropped by about 40 percent after 300 ml of distilled water had been flowed through the core. The rate of loss of permeability was not particularly steep, which indicates that not all of the clays present in the core were of the sodium type. The core was then flooded with 6 percent sodium chloride brine, and the permeability of the core increased somewhat, although it did not regain the initial permeability. In the third stage, distilled water was again injected into the core. After injecting only 50 ml of distilled water into the core, the permeability of the core dropped by about 80 percent, indicating the effect of conversion of the clay to the sodium form after contact with sodium chloride brine, after which the core was much more sensitive to contact with fresh water than it was prior to flowing brine through the core.

In the next series of experiments, a dried core was tested by injecting 10 pore volumes of a 1 percent by weight solution of the tris(ethylenediamine)cobalt (III) chloride treating agent. The pH of this treating fluid was 12.05. The core was shut in overnight after the treatment in order to allow the clays to contact the treating solution thoroughly for maximum stabilization. The permeability of the core increased by 24 percent and finally leveled off at a value which was about 115 percent of the initial permeability. Distilled water was then injected into the core. After injecting 300 ml (30 pore volumes) of distilled water, the permeability of the core was about 95 percent of the initial permeability. Six percent sodium chloride ion was then flowed through this treated core in order to sensitize it by contact with sodium ions, after which distilled water was again injected into the core and it was noted that the permeability of the core decreased by 80 percent.

In the next series of experiments, a treating fluid which comprise 1 percent by weight tris(ethylenediamine)cobalt (III) chloride and 6 percent sodium chloride with a pH of 7.7 was formulated and injected into a dried core. The core was shut in overnight, after which it was determined that the permeability of the core had increased to a value which was about 122 percent of the initial permeability. Three-hundred ml of distilled water was then flowed through the core, and it was determined that the permeability thereafter had declined to a value of about 95 percent of the initial permeability in the core. This indicated that the cobalt complex treating fluid was compatible with sodium chloride brine, and the presence of brine in the treating fluid did not interfere with the stabilization effect of the cobalt complex solution. The core was then sensitized by injecting 6 percent sodium chloride brine, after which 200 ml of a 0.1 percent cobalt complex solution was injected in the core. The core permeability remained constant at a value which was about 98 percent of the initial permeability. It was determined, however, that 500 ml of 0.05 percent of the cobalt complex treating solution caused a lowering or reduction of permeability of the core by about 40 percent. These tests clearly indicate that 0.1 percent cobalt complex was sufficient to maintain a high level of permeability in a water sensitive core, even if the core was sensitized with sodium chloride brine prior to being treated with the cobalt complex.

The next experiment was conducted to determine whether the cobalt complex was effective to reverse the damage which had occurred in a core by contact with distilled water. A dried core was deliberately damaged by injecting 250 ml of distilled water, after which the core was treated with 1 percent of the cobalt complex in a 6 percent sodium chloride brine having a pH of 7.05. The fluid was allowed to remain in the core overnight. After injecting 150 ml of treating solution, the permeability of the core was restored and in fact had increased to a level of about 125 percent of the initial permeability of the core. Three hundred ml of distilled water was then injected, and the permeability was reduced to a level of about 106 percent of the initial permeability. Sensitization of the core with brine followed by treatment with 0.1 percent cobalt complex solution resulted in the permeability leveling off at about 100 percent of the initial permeability. This clearly indicates the ability of the cobalt complex treating fluid to reverse the damage caused to a clay-containing formation sample by contact with fresh water.

In the next experiment, a dried core was deliberately damaged by injecting distilled water, after which a treating solution comprising 0.25 percent of the cobalt complex in a 1.5 percent sodium chloride brine, pH equal 12, was injected. After the treating fluid had been allowed to remain in the core overnight, it was determined that the permeability of the core had not only been restored but had increased to a value of 125 percent of the initial permeability. Distilled water was again injected into the core and it was determined that the permeability leveled off at about 82 percent. The core was then resensitized with brine and treated with 0.1 percent cobalt complex solution, after which the core permeability had a value of about 92 percent of the initial permeability.

The above experiments clearly demonstrate the effectiveness of the cobalt complex solution for treating a moderately damaged formation, by first injecting a solution containing between 0.1 and 1.0 percent of the cobalt complex, which is effective to restore the permeability and maintain it at a high level even during a subsequent fresh water flood. If the formation is sensitized by invasion of sodium chloride brine, the permeability of the formation can be maintained with a 0.1 percent cobalt complex solution flood.

The foregoing clearly demonstrates the effectiveness of the polyvalent metal ion complex treating methods of my invention, for the purpose of preventing damage to water sensitive clay containing formations by contact with fresh water, even if the formation has been sensitized by contact with sodium chloride brine. While description of my invention has involved disclosure of a number of specific embodiments, it is clearly not so limited since many variations thereof will be apparent to persons skilled in the art of oil recovery and formation treatment without departing from the true spirit and scope of my invention. It is my intention that my invention be limited and restricted only by the limitations and restrictions contained in the claims appended immediately hereinafter below.

I claim:

1. A method for treating a subterranean earth formation containing water-sensitive clays, to render the formation less sensitive to loss of permeability due to contact with fresh water, comprising:

contacting said earth formation with an effective amount of an aqueous fluid containing a chelated polyvalent transition metal ion, said metal being selected from the group consisting of cobalt, nickel, iron, chromium and copper, and comprising an organic chelating ligand selected from the group consisting of ethylenediamine, propylenediamine, α,α'-dipyridyl, and o-phenanthroline.

2. A method as recited in claim 1 wherein the concentration of the chelated polyvalent metal ion in the fluid is from 0.01 to 10 percent by weight.

3. A method as recited in claim 1 wherein the concentration of the chelated polyvalent metal ion in the fluid is from 0.1 to 5 percent by weight.

4. A method as recited in claim 1 wherein the treatment is applied only to the portion of the formation immediately adjacent to the wellbore, and the volume of fluid is from 50 to 1000 gallons per foot of formation thickness.

5. A method as recited in claim 1 wherein the treatment is applied only to the portion of the formation immediately adjacent to the wellbore, and the volume of fluid is from 100 to 700 gallons per foot of formation thickness.

6. A method as recited in claim 1 wherein the treatment is applied to at least a portion of the formation between an injection well and a production well penetrating said formation, and volume of treating fluid is from 0.01 to 1.0 pore volumes based on the pore volume of the recovery zone between the injection well and production 7. A method as recited in claim 1 wherein the treatment is applied to at least a portion of the formation between an injection well and a production well penetrating said formation, and the volume of treating fluid is from 0.05 to 0.50 pore volumes based on the pore volume of the recovery zone between the injection well and production well.

8. A method as recited in claim 1 wherein said earth formation has experienced moderate loss of permeability by contact with fresh water, wherein the concentration of the chelated polyvalent metal ion is from 0.1 to 1 percent by weight.

9. A method as recited in claim 1 wherein the sensitive clay fraction of the earth formation has been previously sensitized by contact with a sodium chloride brine, comprising maintaining the permeability of the formation during the course of injecting fresh water into the formation by incorporating at least 0.1 percent by weight of the chelated polyvalent metal ion in the flood water.

10. A method as recited in claim 1 wherein the chelated polyvalent transition metal ion is tris(ethylenediamine) cobalt chloride.

11. A method as recited in claim 1 wherein the chelated transition metal ion is tris (ethylenediamine) nickel.

12. A method as recited in claim 1 wherein the chelated transition metal ion is tris(propylenediamine) cobalt.

13. A method as recited in claim 1 wherein the chelated transition metal ion is tris(α,α'-dipyridyl) nickel.

14. A method as recited in claim 1 wherein the chelated transition metal ion is tris(o-phenanthroline) cobalt.